TREATMENT OF WATER

Kenkere C. Channabasappa, Chicago, and Paul G. Bird, Wheaton, Ill., assignors to Wright Chemical Corporation, Chicago Ill., a corporation of Illinois
No Drawing. Filed June 23, 1959, Ser. No. 822,194
13 Claims. (Cl. 21—2.7)

The present invention relates generally to the treatment of water and, more particularly, it relates to the inhibition and prevention of corrosition and scale in various systems in which water circulates.

Coolng waters are used in many industrial plants, such as oil refineries, chemical plants, and other types of industrial plants, and are used in various types of equipment such as in heat exchangers, condensers, cooling towers, and associated distribution equipment. If available water supplies are used, scale and corrosion problems are usually experienced in the plants and equipment.

Controlling corrosion of metallic parts in systems employing cooling waters results in greater reduction of maintenance and operating cost. The degree of metallic corrosion by aqueous solutions is dependent on such factors as temperature, flow rate, dissolved solids and oxygen content of cooling waters. Since the cooling waters used are obtained from different sources and have varied composition depending upon the geology of the terrain, and are contaminated with various amounts of corrosive gases such as $H_2S$, mercaptans and corrosive liquids such as organic acids, no single method or material could be used as a cure-all for this purpose.

As used herein, the term "sweet water" means water which does not contain compounds of the class of sulfides and mercaptans, whereas the term "sour water" is used to describe water containing one or more of those substances.

In the past, the widely used materials to inhibit corrosion of ferrous and non-ferrous metals and alloys in contact with cooling waters not contaminated with $H_2S$ and mercaptans have been chromates. Phosphates have been used in both sweet and sour water systems. Chromates, undoubtedly, provide a greater degree of protection to metal attack by corrosive industrial waters, only when used at high concentrations and, therefore, treating cooling waters with chromates results in prohibitive costs. At low concentrations, chromates are ineffective for localized corrosion attack on metals. Chromates, however, cannot be used economically in sour water systems due to continuous reduction of hexavalent chromium to trivalent chromium by reducing gases, such as $H_2S$, mercaptans, and the like. Furthermore, the toxicity of chromates poses a very difficult problem of handling and disposal of water, treated with this material.

The relatively low cost and non-toxic phosphates have been used for controlling corrosion by cooling waters with very limited success. However, at high concentrations, depending upon the temeprature, flow rate, pH and dissolved solid contents of cooling water employed systems, the polyphosphates revert to relatively less effective orthophosphates of limited solubility. Attempts have been made to enhance the corrosion inhibition power of phosphates by addition of small quantities of materials such as cyanates, cyanides, manganates, zinc, silicate, organic materials and the like which are reported to have a synergistic effect on the ability of phosphates to reduce metal loss. Although mixtures containing phosphates and the above-mentioned materials have shown a definite improvement over phosphates alone in reducing the general corrosion attack, little or no beneficial effects of these additive compounds have been observed in eliminating the characteristic tendency of phosphates to cause pitting.

Accordingly, a general object of this invention is to provide improved water compositions in various industrial applications and to provide an improved water treating composition.

A more particular object of this invention is to provide an improved cooling water for industrial plants and equipment which will limit corrosion and scale formation in the plants and equipment so as to provide improved heat transfer and to provide longer life to the plants and equipment.

A still further object of the invention is the provision of an improved water treating composition for addition to sour water.

These and other objects of the invention are provided by mixing with water a soluble phosphate, a substituted alkyl pyridine and a quaternary ammonium salt. An organic chelating agent may be employed as a substitute for a portion of the quaternary ammonium salt.

The water soluble phosphates may be any of the polyphosphates, comprising pyrophosphate, tripolyphosphate, and the glassy polyphosphates, such as hexametaphosphate. The soluble phosphates of the invention may also include various orthophosphates. The water soluble salts will usually be the ammonium, potassium and sodium salts of the foregoing phosphate compounds.

The quaternary ammonium salt will be selected from the group consisting of compounds having one of the following general formulas:

(1) 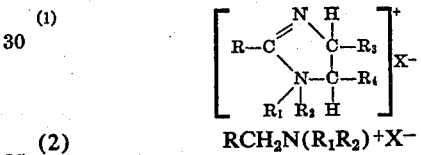

(2) $\quad RCH_2N(R_1R_2)^+X^-$

In the formulas R is a fatty acid and $R_1$ is a radical selected from the group consisting of alicyclic and alkyl groups in which an alicyclic carbon atom is attached to the quaternary nitrogen atom; $R_2$ is a radical, containing not more than six carbon atoms, selected from the group consisting of hydrocarbon radicals, hydroxy hydrocarbon radicals and amino hydrocarbon radicals; and $R_3$ and $R_4$ radicals from the group consisting of alicyclic and alkyl groups. X is an anion which will form a water soluble salt with the cation and, by way of example, includes chloride, bromide, $PO_4$ ion, nitrates, and organic anions like acetate and propionate.

For purposes of this application, Formula 1 is referred to as a substituted imidazoline type quaternary ammonium salt and Formula 2 is referred to as a straight chain alkyl or aryl or alicyclic substituted type quaternary ammonium salt or mixture thereof.

The substituted alkyl pyridines are generally insoluble in water but can be solubilized to some degree by the presence of a cosolvent which, in the composition of the invention, is the quaternary ammonium salt. The substituted alkyl pyridines of this invention have alkyl chains which have from 6 to 10 carbon atoms in the alkyl chain. The alkyl chains may be substituted in the alpha, beta or gamma positions, either singly or in any two or all positions. The substituted alkyl pyridines of the invention will boil at temperatures in excess of about 180° F., i.e. they are high boiling compounds.

The water soluble organic chelating compounds which can be used in this invention include ethylene diamine tetraacetic acid, or the water soluble salts thereof, dimethyl glyoxime, alpha benzoin oxime, alpha pyridylhydrazine, and ethanolamines. These compounds are used as a substitute for some of the quaternary ammonium salts but they cannot be used in too large amounts as they may have corrosive properties. This class of chelating compounds is generally known in the art and various other compounds having similar chelating properties are known.

The composition of the invention has been found effective in the pH range from about 5.0 to about 8.5, but best results are obtained in the pH range from about 6.5 to about 7.5.

The treated water of the invention comprises from about 1 p.p.m. (part per million) to about 100 p.p.m. of the composition of the invention. For most available water supplies, the composition of the invention will be used at levels of from 20 to 30 p.p.m. for sweet waters and from 30 to 50 p.p.m. for sour waters.

The phosphates are used in amounts of from about 1 to about 100 p.p.m., the substituted alkyl pyridines are employed at levels of from about .01 p.p.m. to about 10 p.p.m., and the quaternary ammonium compounds are added at levels from .1 p.p.m. to about 60 p.p.m. The relative amounts of these compounds are desirably in the following proportions, expressed as ratio of phosphate to quaternary ammonium compounds to substituted alkyl pyridines; 72:15:13, 93:6:1, 72:26:2. When the compounds are mixed in these proportions, there is minimum scale formation and corrosion of ferrous and non-ferrous metal materials. While some benefits can be obtained with mixtures outside these ranges, best results are obtained in the particular range. Most satisfactory results are obtained with a mixture of compounds comprising 81 percent phosphate, 16 percent of a quaternary ammonium compound, and 3 percent of substituted alkyl pyridine.

An organic chelating agent may be added up to levels of about 5 p.p.m.

Particular examples of the compounds of the invention are set forth below.

*Example I*

| | Parts |
|---|---|
| Sodium hexametaphosphate | 150 |
| Quaternary ammonium salt (substituted imidazoline type) | 30 |
| Ethylene diamine tetraacetic acid | 10 |
| Alkyl pyridines (boiling point 265° F.) | 1 |

*Example II*

| | |
|---|---|
| Sodium hexametaphosphate | 150 |
| Quaternary ammonium salt (substituted imidazoline type) | 30 |
| Alkyl pyridines (boiling point 240° F.) | 1 |

*Example III*

| | |
|---|---|
| Sodium tripolyphosphate | 20 |
| Quaternary ammonium salt (substituted imidazoline type) | 3 |
| Ethylene diamine tetraacetic acid | 1 |
| Substituted alkyl pyridine (boiling point 180° F.) | 1 |

*Example IV*

| | |
|---|---|
| Sodium tripolyphosphate | 15 |
| Quaternary ammonium salt (straight chain alkyl substituted type) | 5 |
| Ethylene diamine tetraacetic acid | 1 |
| Substituted alkyl pyridine (boiling point 240° F.) | .8 |

*Example V*

| | |
|---|---|
| Sodium hexametaphosphate | 15 |
| Quaternary ammonium salt (straight chain aryl substituted type) | 3 |
| Ethylene diamine tetraacetic acid | 1 |
| Substituted alkyl pyridine (boiling point 240° F.) | .8 |

*Example VI*

| | |
|---|---|
| Sodium hexametaphosphate | 15 |
| Quaternary ammonium salt (straight chain alicyclic substituted type) | 3 |
| Ethylene diamine tetraacetic acid | 1 |
| Substituted alkyl pyridine (boiling point 240° F.) | .8 |

Each of the foregoing compositions gave good results when added to sour water having from 50 to 80 p.p.m. of sulfur ion (2 valences), from 80 to 200 p.p.m. of calcium, 40 p.p.m. magnesium, 120 p.p.m. alkalinity as calcium carbonate, 10 to 300 p.p.m. sulfate, 6 p.p.m. oxygen, and 15 to 200 p.p.m. chloride.

The foregoing compositions also gave good results when added to sweet water having 80 to 200 p.p.m. of calcium, 40 p.p.m. magnesium, 120 p.p.m. alkalinity as calcium carbonate, 10 to 300 p.p.m. sulfate, 6 p.p.m. oxygen, and 15 to 200 p.p.m. chloride.

The treated waters had pH's from about 6.0 to about 8.0 for purposes of the test but were varied from pH 5.0 to pH 8.5 in other tests.

In making the composition which is added to water, the alkyl pyridine and quaternary ammonium salts are mixed and this mixture is blended with the phosphates. The product is a damp but non-caking powder when higher amounts of quaternary ammonium salts and substituted alkyl pyridines are used. However, the composition of the invention can be made to be free flowing by the addition of certain well known fillers, such as sodium sulfate, soda ash, nitrates and salt. If the composition of the invention is to be dissolved in high concentration for purposes of feeding, the filler should not cause the pH of the solution to exceed about 7 since the composition of the invention is not soluble at high concentrations and high pH values. A high concentration is an amount of the composition in excess of .1 pound per gallon of solution.

The precise way in which the compositions of the invention function is not altogether known but it appears that it provides a protective coating to the equipment in which it is used and limits formation of scale on the equipment. In any event, ferrous and non-ferrous metals are protected for extended periods of time by the use of the composition of the invention and are provided with an effective barrier against corrosive action by sweet water and sour water. The coating which appears to be provided is sufficiently thin so that there is no problem of blockage in pipes and equipment. Furthermore, the thinness of the coating is such as to assure maximum heat transfer efficiency. In addition, the apparent coating is sufficiently adherent to the metal surfaces to give long protection.

The various features of the invention which are believed to be new are set forth in the following claims.

We claim:

1. A water treating composition comprising a water soluble phosphate selected from the group consisting of orthophosphate and polyphosphate, a water soluble quaternary ammonium salt selected from the group consisting of compounds having the general formula

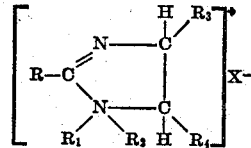

compounds having the general formula

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, and an alkyl pyridine having an alkyl chain of from 6 to 10 carbon atoms.

2. A water treating composition comprising a water soluble phosphate selected from the group consisting of orthophosphate and polyphosphate, a water soluble quaternary ammonium salt selected from the group consisting of compounds having the general formula

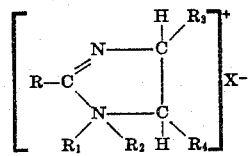

compounds having the general formula

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, an alkyl pyridine having an alkyl chain of from 6 to 10 carbon atoms, and a water soluble organic chelating agent selected from the group consisting of ethylene diamine tetraacetic acid, water-soluble salts of ethylene diamine tetraacetic acid, dimethyl glyoxime, alpha benzoin oxime, alpha pyridylhydrazine, ethanolamine, and mixtures thereof.

3. A water treating composition comprising a water soluble polyphosphate, a water soluble quaternary ammonium salt selected from the group consisting of compounds having the general formula

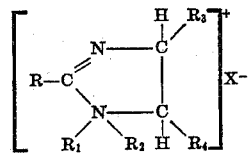

compounds having the general formula

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, and alkyl pyridine having an alkyl chain of from 6 to 10 carbon atoms.

4. A water treating composition comprising a water soluble orthophosphate, a water soluble quaternary ammonium salt selected from the group consisting of compounds having the general formula

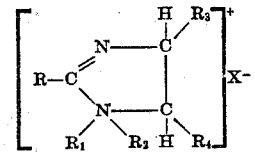

compounds having the general formula

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, and alkyl pyridine having an alkyl chain of from 6 to 10 carbon atoms.

5. A water treating composition comprising sodium hexametaphosphate, a water soluble quaternary ammonium salt selected from the group consisting of compounds having the general formula

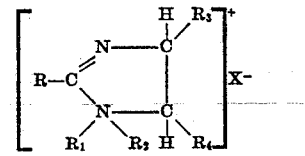

compounds having the general formula

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, and alkyl pyridine having an alkyl chain of from 6 to 10 carbon atoms.

6. A water treating composition comprising sodium tripolyphosphate, a water soluble quaternary ammonium salt selected from the group consisting of compounds having the general formula

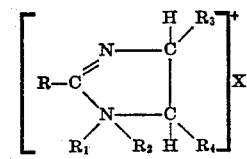

compounds having the general formula

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, and alkyl pyridine having an alkyl chain of from 6 to 10 carbon atoms.

7. A water treating composition comprising sodium tripolyphosphate, a water soluble imidazoline type quaternary ammonium compound having the general formula

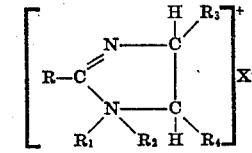

wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ radicals are selected from the group consisting of alicyclic and alkyl groups, and X is an anion which will form a water soluble salt with the cation and alkyl pyridine having an alkyl chain of from about 6 to 10 carbon atoms.

8. A water treating composition comprising sodium tripolyphosphate, a water soluble straight chain alkyl substituted type quaternary ammonium salt having the general formula $$RCH_2N(R_1R_2)^+X^-$$

wherein R is a fatty acid, $R_1$ is a radical consisting of an alkyl group, $R_2$ is a radical containing not more than 6 carbon atoms and selected from the group consisting of alkyl hydrocarbon radicals, hydroxy alkyl hydrocarbon radicals and amino alkyl hydrocarbon radicals, and X is an anion which will form a water soluble salt with the cation, alkyl pyridine having an alkyl chain of from about 6 to 10 carbon atoms, and ethylene diamine tetracetic acid.

9. A water treating composition comprising sodium tripolyphosphate, a water soluble straight chain aryl substituted type quaternary ammonium salt having the general formula $$RCH_2N(R_1R_2)^+X^-$$

wherein R is a fatty acid, $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of aryl hydrocarbon radicals, hydroxy aryl hydrocarbon radicals and amino aryl hydrocarbon radicals, and X is an anion which will form a water soluble salt with the cation, alkyl pyridine having an alkyl chain of from about 6 to 10 carbon atoms, and ethylene diamine tetracetic acid.

10. A water treating composition comprising sodium tripolyphosphate, a water soluble straight chain alicyclic substituted type quaternary ammonium salt having the formula $$RCH_2N(R_1R_2)^+X^-$$

wherein R is a fatty acid, $R_1$ is an alicyclic radical, $R_2$ is a radical containing not more than 6 carbon atoms selected from the group consisting of alicyclic hydrocarbon radicals, hydroxy alicyclic hydrocarbon radicals and amino alicyclic hydrocarbon radicals and X is an anion which will form a water soluble salt with the cation, alkyl pyridine having an alkyl chain of from about 6 to 10 carbon atoms, and ethylene diamine tetracetic acid.

11. A cooling water solution comprising water, water soluble phosphate selected from the group consisting of orthophosphate and polyphosphate in an amount from about 1 to about 100 p.p.m., a water soluble quaternary ammonium compound selected from the group consisting of compounds having the general formula

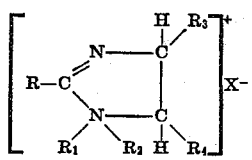

compounds having the general formula $$RCH_2N(R_1R_2)^+X^-$$

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, in an amount from about .1 p.p.m. to about 60 p.p.m. and an alkyl pyridine having an alkyl chain from about 6 to 10 carbon atoms in an amount of about .01 p.p.m. to about 10 p.p.m., the pH of the solution being between about 5.0 and about 8.5.

12. A cooling water solution comprising water, water soluble phosphate selected from the group consisting of orthophosphate and polyphosphate in an amount from about 1 to about 100 p.p.m., a water soluble quaternary ammonium compound selected from the group consisting of compounds having the general formula

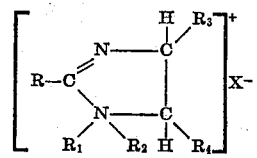

compounds having the general formula $$RCH_2N(R_1R_2)^+X^-$$

and mixture thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, in an amount from about .1 p.p.m. to about 60 p.p.m. and an alkyl pyridine having an alkyl chain from about 6 to 10 carbon atoms in the amount of about .01 p.p.m. to about 10 p.p.m., the pH of the solution being between about 6.5 and about 7.5.

13. A water treatment composition comprising water soluble phosphate selected from the group consisting of orthophosphate and polyphosphate, a quaternary ammonium compound selected from the group consisting of compounds having the general formula

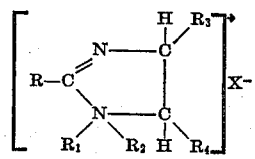

compounds having the general formula $$RCH_2N(R_1R_2)^+X^-$$

and mixtures thereof, wherein R is a fatty acid and $R_1$ is a radical selected from the group consisting of alicyclic and alkyl groups in which an alicyclic carbon atom is attached to the quaternary nitrogen atom, $R_2$ is a radical containing not more than 6 carbon atoms selected from the group consisting of hydrocarbon radicals, hydroxy hydrocarbon radicals and amino hydrocarbon radicals, $R_3$ and $R_4$ are radicals selected from the group consisting of alicyclic and alkyl groups, and X is an anion which will form a water soluble salt with the cation, and alkyl pyridine having an alkyl chain of from 6 to 10 carbon atoms, the ratio of said compounds being in the range from 72:15:13, 93:6:1, and 72:26:2.

References Cited in the file of this patent

UNITED STATES PATENTS

| 2,560,839 | Ayo et al. | July 17, 1951 |
| 2,780,598 | Cafcas | Feb. 5, 1957 |
| 2,786,033 | Gottshall | Mar. 19, 1957 |
| 2,875,210 | Bollenback et al. | Feb. 24, 1959 |
| 2,901,438 | Rogers | Aug. 25, 1959 |

OTHER REFERENCES

NACE, Technical Committee Reports—Publication 53—3, vol. 11, No. 4, April 1955, pp. 65—67.